United States Patent [19]

Hard

[11] 4,389,384

[45] Jun. 21, 1983

[54] PROCESS FOR REDUCING PHOSPHATE ORE

[75] Inventor: Robert A. Hard, Laguna Beach, Calif.

[73] Assignee: Occidental Research Corporation, Irvine, Calif.

[21] Appl. No.: 376,335

[22] Filed: May 10, 1982

[51] Int. Cl.$^3$ .................... C01B 25/12; C01B 25/16; C01B 25/01; C01B 25/02

[52] U.S. Cl. .................... 423/304; 423/318; 423/322; 423/323

[58] Field of Search ............... 423/304, 318, 322, 323; 44/10 H

[56] References Cited

U.S. PATENT DOCUMENTS

| | | | |
|---|---|---|---|
| 1,655,981 | 1/1928 | Barr | 423/318 |
| 2,075,212 | 3/1937 | Levermore et al. | 23/165 |
| 3,235,330 | 2/1966 | Lapple | 423/304 |
| 3,241,917 | 3/1966 | Lapple | 423/304 |
| 3,558,114 | 1/1971 | Saeman | 263/52 |
| 4,351,809 | 9/1982 | Megy et al. | 423/304 X |
| 4,351,813 | 9/1982 | Megy et al. | 423/304 |

OTHER PUBLICATIONS

Ross et al, "Preparation of Phosphoric Acid", vol. 16, No. 6, I & EC, Jun. 1924, pp. 453–566.

Hussein et al, "Kinetics of Calcium Phosphate Reduction by Carbon", Thermochim Acta, 1974, pp. 177–186.

Jacob et al, Redirection of Tricalcium Phosphate by Carbon I & EC, vol. 21, No. 11, Nov., 1929, pp. 1126–1132.

Jacob et al, "Reduction of Tricalcium Phosphate by Carbon", I & EC, vol. 20, No. 11, Nov. 1928, pp. 1204–1210.

Primary Examiner—O. R. Vertiz
Assistant Examiner—Gregory A. Heller
Attorney, Agent, or Firm—Walter A. Hackler

[57] ABSTRACT

A process for producing phosphorus pentoxide from phosphorus ore includes formation of a feed with a phosphate ore, silica and solid carbonaceous material in amounts to produce a feed mixture having a $CaO/SiO_2$ mole ratio of less than about 0.5. The feed mixture is formed into agglomerated feed particles and the particles are heated by exposure to radiation eminating from an oxidation zone to a temperature sufficient to reduce the phosphate by reaction from the solid carbonaceous material to form elemental phosphorus vapor without substantial melting of the agglomerated feed particles. Sufficient oxygen-containing gas is provided to cause oxidation of the elemental phosphorus vapor within the oxidation zone to produce phosphorus pentoxide.

11 Claims, 4 Drawing Figures

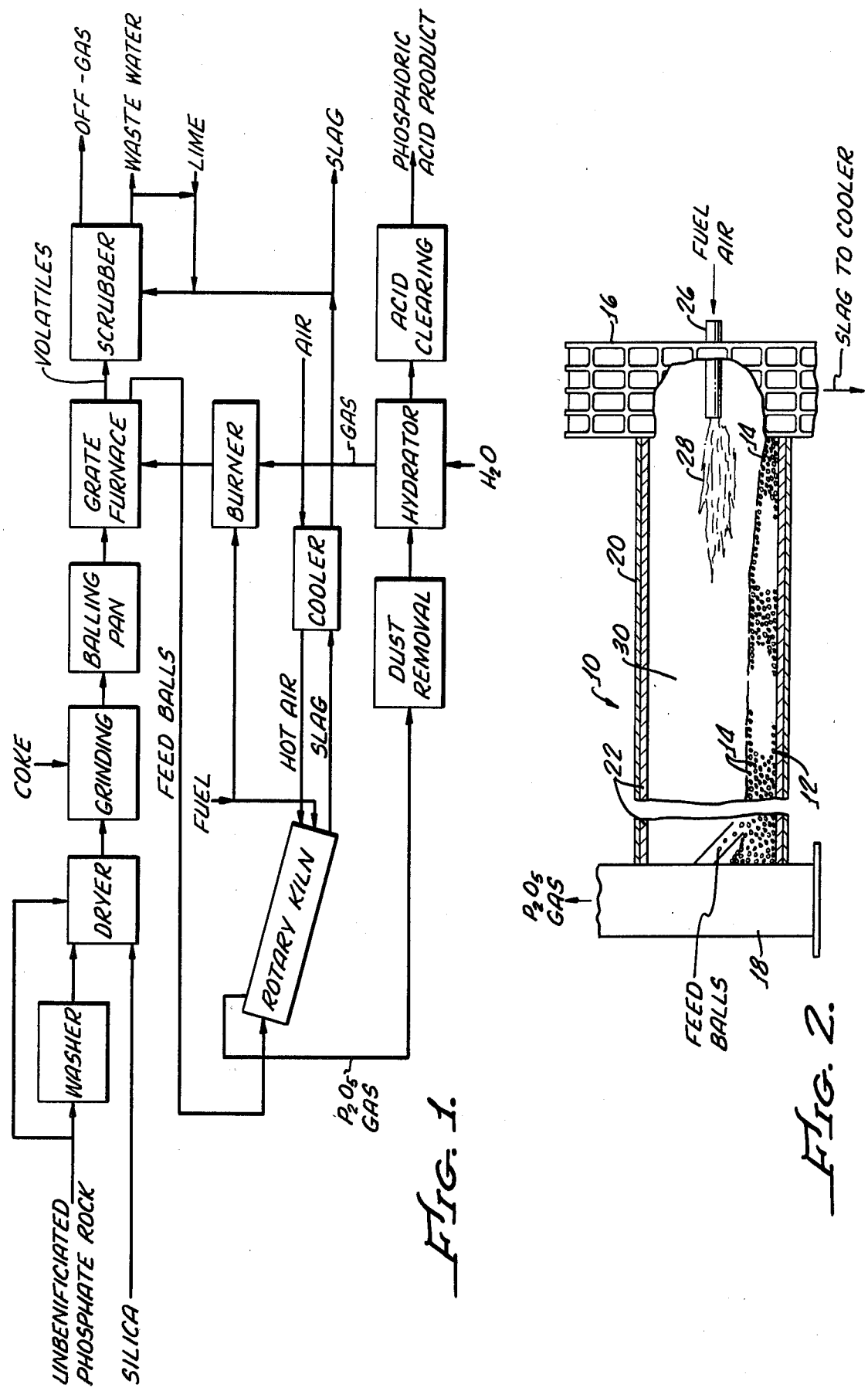

PROCESS FOR REDUCING PHOSPHATE ORE

The present invention pertains generally to the reduction of phosphate and phosphate ores, such as fluorapatite, by reaction with carbonaceous material, and more particularly, the invention is useful for reducing phosphorus pentoxide fluorapatite ore without beneficiation of the ore.

In general, processes for reducing phosphate ore with carbon to produce elemental phosphorus gas have been known for some time. Such reduction may be accomplished in an electric furnace, or, in a rotary kiln such as generally described by Lapple in U.S. Pat. Nos. 3,235,330 and 3,241,917.

In the rotary kiln furnace process for producing phosphorus pentoxide, a reaction bed comprised of fluorapatite ore, carbonaceous material and silica balls is heated to reductively extract elemental phosphorus which, in turn, is burned over the reaction bed to provide a portion of the endothermic heat necessary in the reduction reaction between the carbon and the phosphate ore. The rotary kiln process may be more energy efficient than the electric- arc furnace process because in the latter, the reduced elemental phosphorus must be burned separately to form phosphorus pentoxide and consequently the heat of oxidation therefrom is not effectively recovered.

Although the rotary kiln process for the reduction of phosphate ore with solid carbon has been known for some time as evidenced by the hereinbefore referenced patents, the process has heretofore not been commercially practical because of poor phosphorus yield therefrom, and, because the phosphate ore required extensive beneficiation in order to remove impurities which required considerable capital expenditure and additional production expense, these processes were economically inefficient as well.

Two major problems associated with the rotary kiln phosphate ore process are: melting of the feed material, or reaction bed, within the rotary kiln, and "burnout" of the carbon within the reaction bed, the latter occurring because contact of the oxidizing zone within the rotary kiln with the reaction bed can cause oxidation of the carbon in the bed before reaction between the carbon and the phosphate ore.

Some melting of the feed materials within the rotary kiln can be tolerated, however, if more than about 40% of the reaction bed begins to melt, agglomeration of the feed particles within the reaction bed may occur. These agglomerations grow in size and may adhere to interior surfaces of the kiln thus blocking movement of the reaction bed through the kiln and, in addition, inhibit the reduction of the phosphate ore by the carbonaceous material.

Many attempts have been made to increase the yield of the rotary kiln phosphate ore process to commercial feasibility. For example, one attempt has been to purge the reaction bed with an inert gas in order to drive the reaction, between the phosphate ore and the solid carbonaceous material more rapidly toward complete reduction of the phosphate ore by removal of carbon monoxide and elemental phosphorus vapor from the reaction bed. This was described in a co-assigned U.S. Patent application Ser. No. 265,307 (now U.S. Pat. No. 4,351,813) to Megy et al.

While this procedure significantly increases the yield of the process, melting of the reaction bed is still a problem and further, extensive modification of the kiln is necessary to provide for ports therein to introduce a purging gas beneath the bed while the rotary kiln is rotated. This is not only expensive but it requires increased maintenance costs.

Further investigations have been related to the investigation of particular impurities in the phosphate ore, namely alumina, which significantly affect the melting characteristics of the feed mixture. As disclosed in co-assigned U.S. Patent application Ser. No. 265,305 (now U.S. Pat. No. 4,351,809) to Megy et al, there exists in the $CaO$—$SiO_2$—$CaF_2$ phase diagram a region of $CaO/SiO_2$ mole ratios in which $CaF_2$ has an appreciable solid solubility at the reaction temperatures of interest and this solid solubility of $CaF_2$ in the $CaO$—$SiO_2$ matrix effectively inhibits $CaF_2$ from acting as a fluxing agent in forming a melt in the reaction bed. However, even with this improvement, beneficiation of the phosphate ore is necessary to reduce the alumina impurities therein, and as hereinbefore pointed out, beneficiation of the ore requires additional capital cost and operation expenditures which may cause the overall process to be economically inefficient.

To date, none of the efforts involving rotary kiln processes for the production of phosphoric acid or phosphorus pentoxide have been economically efficient with regard to extracting a major portion of the phosphorus from the phosphate ore.

The present invention is directed to a process for reducing phosphate in phosphate containing ores, without significant beneficiation of the ore, and producing a phosphorus pentoxide, which may then be rehydrated to form phosphoric acid, at a very efficient rate without the necessity of beneficiating the phosphate ore.

SUMMARY OF THE INVENTION

The present invention is directed to a process for reducing phosphate ore and generally comprises the steps of mixing phosphate ore with silica and solid carbonaceous material in amounts to produce a feed mixture having a $CaO/SiO_2$ mole ratio less than about 0.5, forming the feed mixture into agglomerated feed particles, heating the agglomerated feed particles, by exposure to radiation emanating from an oxidation zone within a kiln, to a temperature sufficient to reduce the phosphate ore in the agglomerated feed particles by reaction with the solid carbonaceous material to form elemental phosphorus vapor without substantial melting of the agglomerated feed particles, and, introducing into the kiln sufficient oxygen-containing gas to cause oxidation of the elemental phosphorus vapor within the oxidation zone to produce phosphorus pentoxide and to heat the agglomerated feed particles. More particularly, the process of the present invention for producing phosphorus pentoxide from phosphate ore comprises the steps of mixing unbeneficiated, or washed, phosphate ore with silica and solid carbonaceous material in amounts to produce a feed mixture having a $CaO/SiO_2$ mole ratio of approximately 0.3 and then co-grinding the phosphate ore, silica and carbonaceous material so that 50 to 85 percent of the co-ground feed mixture passes a $-325$ mesh.

After forming the co-ground feed mixture into agglomerated feed particles the particles are heated to a temperature greater than approximately 1300° C. for approximately 30-45 minutes, by exposure to an oxidation zone within a rotary-type kiln. Further, sufficient oxygen-contaning gas is introduced into the rotary-type kiln to cause oxidation of the elemental phosphorus vapor produced by the reaction between the phosphate ore and the solid carbonaceous material within an oxidation zone disposed over the agglomerated feed particles within the kiln in order to cause oxidation of the elemental phosphorus vapor to produce phosphorus pentoxide and also to heat the agglomerated feed particles.

It has now been discovered that if the silica content of feed particles is such that the $CaO/SiO_2$ mole ratio in the feed mixture is less than about 0.5, and preferably about 0.3, the process can recover about 85 percent of the phosphate values in the form of phosphorus pentoxide.

An additional, and important, feature of the present invention is the fact that addition of $SiO_2$ to the feed mixture to the extent of producing a $CaO/SiO_2$ ratio of less than about 0.5, enables the use of unbeneficiated or, washed, phosphate ore. Alternatively, if the phosphate ore, as mined, has a $CaO/SiO_2$ ratio of less than about 0.5 the phosphate ore may be used in the process of the present invention without any addition of $SiO_2$. This significantly reduces the cost of producing phosphorus pentoxide by the process of the present invention.

It should be appreciated, however, that while unbeneficiated phosphate ore may be used to economic advantage, the process can be used to reduce treated or beneficiated phosphate ore.

The effect of silica on the yield of the reaction between the phosphate in the ore and carbon has not heretofore been recognized, and, in fact, is unexpected because of melting considerations to be hereinafter discussed. Lapple, in U.S. Pat. Nos. 3,235,330 and 3,241,917, considered silica to the feed mixture only to adjust the ratio of $CaO/SiO_2$ desired in the final slag product, and utilized a $CaO/SiO_2$ ratio of about three (3).

As hereinbefore pointed out, excessive melting of the feed mixture in the kiln may make the process in a rotary-type kiln inoperable. It has been found that melting in excess of approximtely 40 percent of the feed mixture is not tolerable.

Hence, since $SiO_2$ has a lower melting point than CaO, it was heretofore believed that addition of $SiO_2$ to the feed mixture would cause more melting of the feed and consequently make the process inoperable in a rotary-type kiln. This was recognized by Levermore, et. al., in U.S. Pat. No. 2,075,212. As a further example, in U.S. Pat. No. 3,558,114 to Saeman, a silica to calcium oxide weight ratio of 0.6 to 2.0 (or a $CaO_2/SiO_2$ molar ratio of about 1.7 to 0.5) was required in a rotary furnace phosphate ore reduction process in order to insure the melting point of the slag was low enough to permit removal of liquid slag from the rotary furnace.

BRIEF DESCRIPTION OF THE DRAWINGS

The advantages and features of the present invention will be better understood by the following description and drawings in which:

FIG. 1 is a block diagram of a rotating kiln process for the production of phosphoric acid showing a rotary kiln for the production of phosphorus pentoxide ($P_2O_5$) and associated process apparatus;

FIG. 2 is a diagram of a rotary-type kiln for carrying out the process of the present invention.

DETAILED DESCRIPTION

Figure 3:
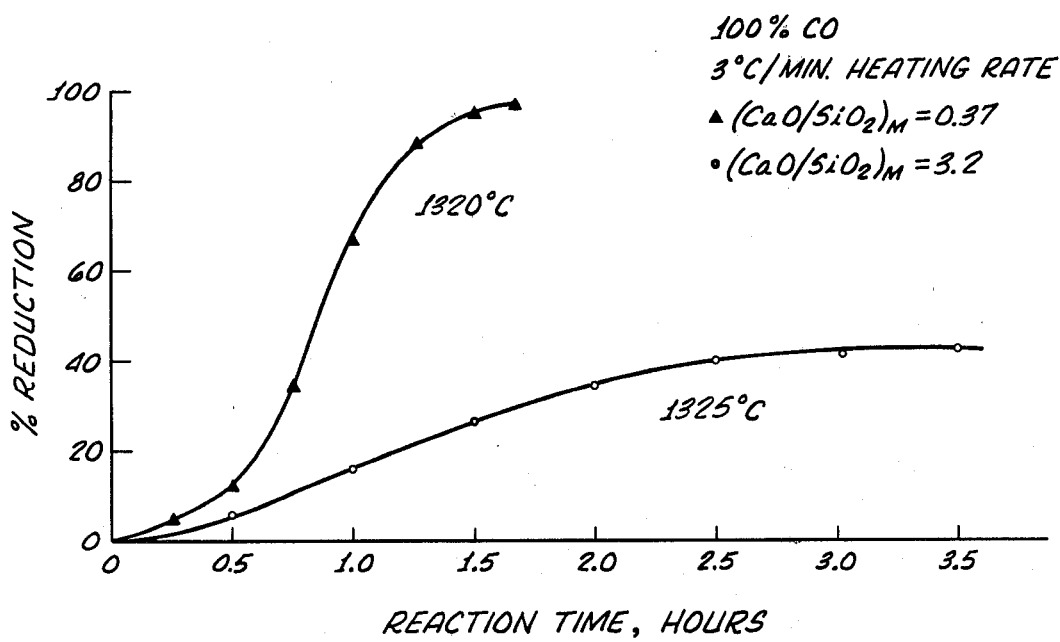
FIG. 3 is a plot showing the percent reduction of phosphate from phosphate ore in sample balls as a function of reaction time for sample balls having $CaO/SiO_2$ mole ratios of approximately 0.37 and approximately 3.2.

Turning now to FIG. 1, there is generally shown, in block diagram form, a rotating kiln process for the production of phosphoric acid.

Heretofore, phosphate rock or ore suitable for use in a rotary kiln process had to be beneficiated. Typical impurities such as iron, sodium, potassium, aluminum and particularly florine, adversely affect the process, and most of these impurities were removed by beneficiation of the ore. The present invention, however, eliminates this step, and as a consequence, significantly reduces the overall cost of producing phosphorus pentoxide in a rotary-type kiln.

In general, the reductive extraction of phosphorus from the beneficiated ore is the result of the reaction between phosphate ore, such as fluorapatite, solid carbonaceous material such as coke or coal, and silica, namely, $Ca_{10}(PO_4)_6F_2$ + carbon + silica + 12,700 BTU (per lb of phosphorus) → phosphorus gas + carbon monoxide + calcium silicate, these reactants should be held in close proximity to each other during the course of the reaction. Hence, it is preferred that the feed materials be agglomerated. This agglomeration also reduces dust within the kiln and reduces clinker formation which may occur if small individual particles of a loose feed material of ore silica and coke were fed into the rotary kiln.

Feed balls are prepared by drying the phosphate ore and silica, grinding the beneficiated phosphate ore, silica, and coke either together or separately and forming the mixture into generally spherical balls with a conventional balling pan, which are then fed to a grate furnace to drive off any volatile materials contained therein. As indicated in FIG. 1 unbeneficiated ore as mined may be used directly in the present process, examples of such ore are those having relatively low clay content such as sandy Florida matrix ore (see Table I). Alternatively, ores having relatively high clay content such as clay Florida matrix ore may be washed with water to remove the clays. In addition, the ore may be floated to remove silica as may be done to reduce shipping costs thereof, however, this silica must be replaced to the ore during preparation of the feed mixture. Economic considerations with regard to the source of phosphate ore and the location of the kiln may make flotation of the ore to remove silica necessary, however, regarding the process of the present invention, removal of silica from the ore is not necessary or desirable since the removed silica must be replaced in order to achieve the proper $CaO/SiO_2$ molar ratio. Washing or flotation of the phosphate ore, however, is not considered, within the context of this process, a beneficiation of the phosphate ore to remove impurities such as iron, sodium, potassium, aluminum and fluorides.

TABLE I

Chemical Compositions of Various Ores

| | Florida Matrix Ores | | | Tennessee Ores | | Simplot Ore Calcined | Baja Ore Floated | Egypt Ore Raw | Chinese Ore Raw |
|---|---|---|---|---|---|---|---|---|---|
| | Washed | Sandy | Clay | Unwashed | Floated | | | | |
| P$_2$O$_5$ | 14.2 | 11.4 | 12.6 | 14.5 | 31.6 | 33.1 | 29.8 | 28.0 | 32 |
| CaO | 19.54 | 15.50 | 17.70 | 17.6 | 43.0 | 49.4 | 41.70 | 41.7 | 48 |
| SiO$_2$ | 54.72 | 58.66 | 51.60 | 59.3 | 8.8 | 9.08 | 7.25 | 6.22 | 4.0 |
| MgO | | | | | | 0.66 | 0.23 | 1.26 | 1.3 |
| Al$_2$O$_3$ | 2.5 | 2.47 | 3.65 | 3.43 | 2.55 | 0.85 | 0.52 | 0.9 | 1.1 |
| Fe$_2$O$_3$ | 0.53 | 0.48 | 1.6 | 4.90 | 4.78 | 0.34 | 0.58 | 3.9 | 1.5 |
| Na$_2$O | 0.38 | 0.29 | 0.34 | 0.25 | | 0.68 | 0.58 | 0.4 | 0.21 |
| K$_2$O | 0.61 | 0.89 | 0.56 | 1.10 | | 0.33 | 0.28 | 0.08 | 0.39 |
| F | | | | | 0.53 | 2.48 | 3.41 | 3.0 | 3.0 |
| TOC | | | | | | 0.01 | | | |
| LOI | | | | | | | | 3.8 | |
| U$_3$O$_8$ | | | | | | 100(ppm) | | 29(ppm) | — |
| (CaO/SiO$_2$) | 0.36 | 0.26 | 0.34 | 0.30 | 3.6 | 5.44 | 5.75 | 6.7 | 12.0 |

TABLE II

Chemical Compositions of Feed Mixtures Made from Various Ores

| | Florida Matrix Ores | | | Tennessee Ores | | Simplot Ore +SiO$_2$ | Baja Ore +SiO$_2$ Floated | Egypt Ore +SiO$_2$ Raw | Chinese Ore +SiO$_2$ Raw |
|---|---|---|---|---|---|---|---|---|---|
| | Washed | Sandy | Clay | Unwashed | +SiO$_2$ Floated | | | | |
| P$_2$O$_5$ | 14.2 | 11.4 | 12.6 | 14.5 | 10.53 | 10.03 | 9.93 | 9.33 | 10.67 |
| CaO | 19.54 | 15.50 | 17.70 | 17.6 | 14.3 | 16.5 | 13.9 | 13.9 | 16.0 |
| SiO$_2$ | 54.72 | 58.66 | 51.60 | 59.3 | 47.78 | 54.89 | 46.33 | 46.33 | 53.33 |
| MgO | | | | | | 0.59 | 0.20 | 1.15 | 1.2 |
| Al$_2$O$_3$ | 2.5 | 2.47 | 3.65 | 3.43 | 2.22 | 0.76 | 0.46 | 0.82 | 1.0 |
| Fe$_2$O$_3$ | 0.53 | 0.48 | 1.6 | 4.90 | 4.16 | 0.30 | 0.52 | 3.57 | 1.4 |
| Na$_2$O | 0.38 | 0.29 | 0.34 | 0.25 | | 0.60 | 0.52 | 0.4 | 0.20 |
| K$_2$O | 0.61 | 0.89 | 0.56 | 1.10 | | 0.29 | 0.25 | 0.07 | 0.37 |
| F | | | | | 0.53 | 2.20 | 3.04 | 2.7 | 2.9 |
| TOC | | | | | | 0.01 | | | |
| LOI | | | | | | | | 3.5 | |
| U$_3$O$_8$ | | | | | | 89(ppm) | | 27(ppm) | — |
| (CaO/SiO$_2$) | 0.36 | 0.26 | 0.34 | 0.30 | 0.30 | 0.30 | 0.30 | 0.30 | 0.30 |

Table I shows the chemical compositions of various ores along with the CaO/SiO$_2$ ratio for each type of ore. Ores such as Tennessee ore may be used directly in the process of the present invention without washing as the CaO/SiO$_2$ ratio is approximately 0.30. The effect of washing and floating on the ores is also shown.

In Table II, the same phosphate ores are shown with added silica to bring the CaCO/SiO$_2$ ratio to below 0.50. These ores are suitable for reduction and production of P$_2$O$_5$ by the process of the present invention.

As shown in FIG. 1, gases driven off of the grate furnace are passed for elimination from the system and the preheated feed balls are fed into a rotary kiln 10. Solid residue, or slag, is removed from the rotary kiln and passed through a cooler for cooling the residue and simultaneously heating input air for the rotary kiln 10. Product gas, or vapor, P$_2$O$_5$, is removed from the rotary kiln and passed through a dust removal stage and a hydrater to form phosphoric acid and thereafter cleaned to produce a product phosphoric acid as is well known in the art.

While a rotary kiln 10 is shown in FIGS. 1 and 2 and described herein in connection with the process of the present invention, it is to be appreciated that other type kilns or furnaces such as a tunnel, or grate, furnace may be employed.

FIG. 2 more particularly illustrates a rotary-type kiln 10 for carrying out the process of the present invention, although other kilns may be used, a rotary kiln is particularly suited for the reduction of phosphate ores because of its efficiency in transferring heat directly to a bed 12 consisting of agglomerated feed particles or balls, 12 as hereinabove described. The rotary-type kiln may be of conventional design, having stationary end portions 16, 18, and a rotating center section, or cylinder 20 lined with a suitable refractory 22, interconnected therewith, mechanism for rotating the cylinder 20 not being shown in FIG. 2.

Fuel and air, or oxygen, are fed to a burner 26 which produces a flame 28 for directly heating the bed 12. It is to be appreciated that the term "flame" within the meaning of this specification includes either the luminous portions of an oxidizing reaction, the hot gases associated therewith, or both.

For start-up, a conventional fuel may be used to preheat the kiln center portion 20 and the bed 12, but as the reaction in the bed produces elemental phosphorus vapor and carbon monoxide which are burned in an oxidation zone 30, less fuel is required. Sufficient air or oxygen must be provided, however, to oxidize the phosphorus and the carbon monoxide above the bed in an oxidation zone 30 for heating the bed by radiation therefrom.

The present invention is particularly directed to a process for the reduction of phosphate ores such as fluorapatite (Ca$_{10}$(PO$_4$)$_6$F$_2$), the reduction reaction being generalized as:

Ca$_{10}$(PO$_4$)$_6$F$_2$+15C+9×SiO$_2$→15CO+3/2P$_4$+9-[CaO×SiO$_2$]+CaF$_2$, where $0 \leq x \leq 5$.

Little reaction kinetic information has been known regarding the hereinabove noted reduction reaction for phosphorus oxide. This may be due to the fact that prior furnace techniques for the reduction of phosphorus oxides proceeded in the molten phase. Hence, kinetic studies in the literature were concerned with liquid phase reduction. In the process of concern of this invention, however, the melting of the solids in the feed balls 14 within the bed 12 leads to agglomeration or clinkering of the feed balls, which causes undesirable material handling problems in the operation of rotary-type kilns and inhibits the reduction reaction thus producing less phosphorus yield from the feed.

The effect of silica on the rate and reduction of phosphorus from phosphate ore was experimentally found through the use of a typical thermogravimetric analyzer (TGA), not shown, consisting of an electronic balance, a closed furnace, temperature control, gas mixing system, sample boat, and a recording system. The analyzer, which is typical of those well known in the art, measures the weight of a material and its rate of change continuously, either as a function of increasing temperature and/or preselected temperature over a period of time.

TABLE III

| Material Analysis for Sample Ore Balls | | | |
|---|---|---|---|
| Material | Mesh Size | Analysis | |
| Phosphate Rock | −325 | CaO | 42.2% |
| | | $P_2O_5$ | 32.0% |
| | | $SiO_2$ | 6.0% |
| | | $Al_2O_3$ | 0.96% |
| | | MgO | 0.33% |
| | | $Fe_2O_3$ | 0.76% |
| | | F— | 3.7% |
| Green Coke | −325 | Fixed Carbon | 89.5% |
| | | Volatiles | 10.5% |
| Silica | −325 | $SiO_2$ | 97.7% |

Phosphate rock, green coke, and silica having a composition as shown in Table III were individually ground and formed into approximately one (1) gram, 3/8 inch diameter, sample ore balls, one group of balls having a CaO to $SiO_2$ mole ratio of approximately 3.2, and another group of balls having a CaO to $SiO_2$ mole ratio of approximately 0.37. The sample balls were dried at 110° C. and thermogravimetric analysis was then performed with the thermogravimetric analyzer on the samples isothermally at a number of temperatures from 1300° to 1500° C.

Results of the thermogravimetric analysis (TGA) at about 1320° C., which included heating the ore balls at a rate of approximately 3° C. per minute carbon monoxide atmosphere are shown in FIG. 3.

In FIG. 3 the percent reduction of phosphate in the sample balls have a $CaO/SiO_2$ mole ratio of 0.37 and 3.2 and are plotted as a function of reaction time.

Figure 4:
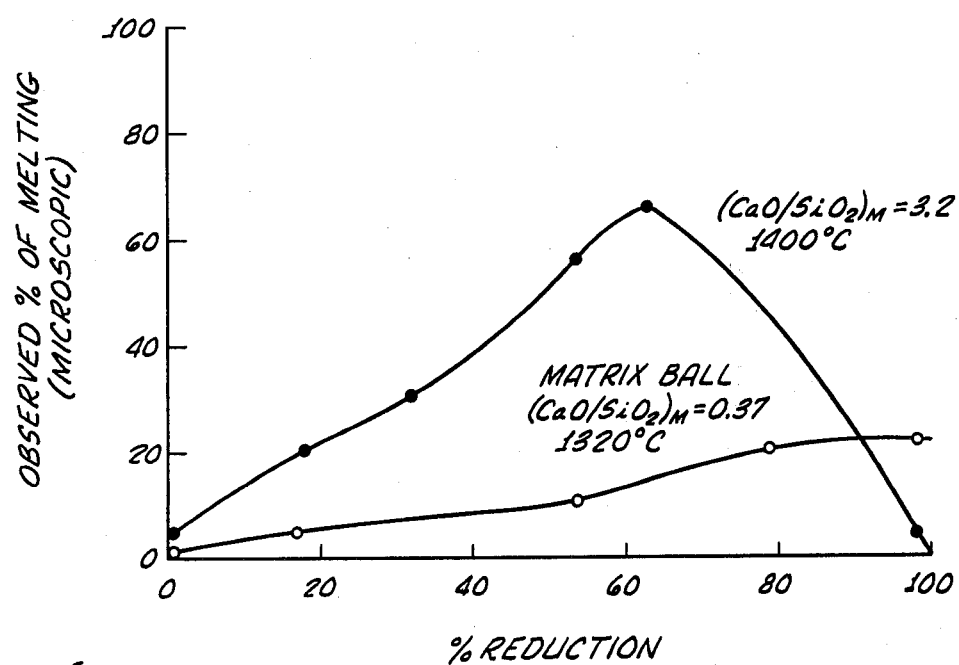
FIG. 4 is a plot showing the percent of melting as a function of percent reduction of phosphate values from phosphate ore in sample balls having $CaO/SiO_2$ mole ratios of approximately 0.37 and approximately 3.2.

As discussed hereinabove, it has also been observed that feed ball melting is dependent on the $CaO/SiO_2$ ratio. Present experiments, including the heating of ore balls having various $CaO/SiO_2$ ratios, have shown (see FIG. 4) that at a $CaO/SiO_2$ mole ratio of about 0.37, significant ore ball melting does not occur, compared to a conventional $CaO/SiO_2$ mole ratio of about 3.2. FIG. 4 is a plot of the observed percent of melting done by microscopic analysis of heated sample balls as a function of percent reduction of phosphate values in the phosphate ore.

The following examples are presented by way of illustration only and are not to be considered limiting to the present invention.

EXAMPLE I

Feed was prepared using washed and floated Mexican phosphate ore mined in Baja containing 30.8% wt. $P_2O_{5bl}$, 47.8% wt. CaO and 7.4% wt. $SiO_2$ and having a CaO to $SiO_2$ molar ratio of about 6.9. The ore and calcined, delayed petroleum coke were coground in a ball mill to about 77% −325 mesh. The ground coke/ore mixture was then blended with the fine silica flour having a particle size of 83% −325 mesh 12 weight parts water in a Simpson mix-muller. The weight percent of the solids in the feed mixture were:

| | Weight Parts |
|---|---|
| Phosphate ore | 38.4 |
| Petroleum coke | 10.3 |
| Silica sand | 51.3 |
| | 100.0 |

Pellets of nominal ½ inch diameter were formed from this wet mixture using a balling disk. The pellets were dried in a traveling grate, hot air dryer. With the addition of the silica, the dried feed had a calcium oxide to silica molar ratio of approximately 0.36.

The prepared feed pellets were fed continuously to a refractory lined, rotary kiln at the rate of 600 lbs/hr. The kiln was 2¾ ft in internal diameter and 30 feet in length. The kiln was fired by a natural gas burner, with the gases passing counter current to the solid feed. The kiln rotation speed was 3 rpm and the slope was ⅛ inch per foot.

The maximum solids temperature was 1459° C. Under these conditions, approximately 86% of the phosphate values in the phosphate ore were recovered. Residence time of the pellets in the kiln was approximately two hours with the pellet temperature being above about 1300° C. for approximately forty minutes.

EXAMPLE II

Dried pellet feed was prepared in the manner of Example I above with the same recipe, excepting that the coke, ore and course silica sand were coground to 75% minus 200 mesh.

This feed was fed to the same continuous kiln as in Example I at a 480 lbs/hr rate with 120 lbs/hr of coarse (¼ inch) calcined petroleum coke. The maximum solids temperature was 1454° C. Under these conditions approximately 86% of the phosphate values in the phosphate ore were recovered.

Although there has been described hereinabove a specific process for reducing phosphate ore in accordance with the invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A process for producing phosphorus pentoxide from phosphate ore comprising the steps of:
   mixing phosphate ore with silica and solid carbonaceous material in amounts to produce a feed mixture having a $CaO/SiO_2$ mole ratio less than about 0.5;

forming the feed mixture into agglomerated feed particles;

heating the agglomerated feed particles, by exposure to radiation emanating from an oxidation zone to a temperature sufficient to reduce the phosphate in the agglomerated feed particles by reaction with the solid carbonaceous material to form elemental phosphorus vapors without substantial melting of the agglomerated feed particles; and, providing sufficient oxygen-containing gas to cause oxidation of the elemental phosphorus vapor within the oxidation zone to produce phosphorus pentoxide and to heat the agglomerated feed particles.

2. A process for producing phosphorus pentoxide from phosphate ore comprising the steps of:

mixing unbeneficiated phosphate ore with silica and solid carbonaceous material in amounts to produce a feed mixture having a $CaO/SiO_2$ mole ratio less than about 0.5;

forming the feed mixture into agglomerated feed particles;

heating the agglomerated feed particles, by exposure to radiation emanating from an oxidation zone to a temperature sufficient to reduce the phosphate i the agglomerated feed particles by reaction with the solid carbonaceous material to form elemental phosphorus vapors without substantial melting of the agglomerated feed particles; and, providing sufficient oxygen-containing gas to cause oxidation of the elemental phosphorus vapor within the oxidation zone to produce phosphorus pentoxide and to heat the agglomerated feed particles.

3. A process for producing phosphorus pentoxide from phosphate ore comprising the steps of:

washing phosphate ore to remove clays therefrom;

mixing the washed phosphate ore with silica and solid carbonaceous material in amounts to produce a feed mixture having a $CaO/SiO_2$ mole ratio less than about 0.5;

forming the feed mixture into agglomerated feed particles;

heating the agglomerated feed particles, by exposure to radiation emanating from an oxidation zone to a temperature sufficient to reduce the phosphate in the agglomerated feed particles by reaction with the solid carbonaceous material to form elemental phosphorus vapors without substantial melting of the agglomerated feed particles; and, providing sufficient oxygen-containing gas to cause oxidation of the elemental phosphorus vapor within the oxidation zone to produce phosphorus pentoxide and to heat the agglomerated feed particles.

4. A process for producing phosphorus pentoxide from phosphate ore comprising the steps of:

mixing phosphate ore with silica and solid carbonaceous material in amounts to produce a feed mixture having a $CaO/SiO_2$ mole ratio less than about 0.5;

forming the feed mixture into agglomerated feed particles;

heating the agglomerated feed particles, by exposure to radiation emanating from an oxidation zone within a rotary-type kiln, to a temperature sufficient to reduce the phosphate in the agglomerated feed particles by reaction with the solid carbonaceous material to form elemental phosphorus vapors without substantial melting of the agglomerated feed particles; and, introducing into the rotary-type kiln sufficient oxygen-containing gas to cause oxidation of the elemental phosphorus vapor within the oxidation zone to produce phosphorus pentoxide and to heat the agglomerated feed particles.

5. A process for producing phosphorus pentoxide from phosphate ore comprising the steps of:

mixing beneficated phosphate ore with silica and solid carbonaceous material in amounts to produce a feed mixture having a $CaO/SiO_2$ mole ratio less than about 0.5;

forming the feed mixture into agglomertaed feed particles;

heating the agglomerated feed particles, by exposure to radiation emanating from an oxidation zone within a rotary-type kiln, to a temperature sufficient to reduce the phosphate in the agglomerated feed particles by reaction with the solid carbonaceous material to form elemental phosphorus vapors without substantial melting of the agglomerated feed particles; and, introducing into the rotary-type kiln sufficient oxygen-containing gas to cause oxidation of the elemental phosphorus vapor within the oxidation zone to produce phosphorus pentoxide and to heat the agglomerated feed particles.

6. A process for producing phosphorus pentoxide from phosphate ore comprising the steps of:

washing phosphate ore to remove clays therefrom;

mixing the washed phosphate ore with silica and solid carbonaceous material in amounts to produce a feed mixture having a $CaO/SiO_2$ mole ratio less than about 0.5;

forming the feed mixture into agglomerated feed particles;

heating the agglomerated feed particles, by exposure to radiation emanating from an oxidation zone within a rotary-type kiln, to a temperature sufficient to reduce the phosphate in the agglomerated feed particles by reaction with the solid carbonaceous material to form elemental phosphorous vapors without substantial melting of the agglomerated feed particles; and, introducing into the rotary-type kiln sufficient oxygen-containing gas to cause oxidation of the elemental phosphorus vapor within the oxidation zone to produce phosphorus pentoxide and to heat the agglomerated feed particles.

7. A process for producing phosphorus pentoxide from phosphate ore comprising the steps of:

mixing unbeneficiated phosphate ore with silica and solid carbonaceous material in amounts to produce a feed mixture having a $CaO/SiO_2$ mole ratio less than about 0.5;

forming the feed mixture into agglomerated feed particles;

heating the agglomerated feed particles to a temperature greater than approximately 1300° C., by exposure to radiation emanating from an oxidation zone within a rotary-type kiln, to reduce the phosphate in the agglomerated feed particles by reaction with the solid carbonaceous material to form elemental phosphorus vapors without substantial melting of the agglomerated feed particles; and, introducing into the rotary-type kiln sufficient oxygen-containing gas to cause oxidation of the elemental phosphorus vapor within the oxidation zone to produce phosphorus pentoxide and to heat the agglomerated feed particles.

8. A process for producing phosphorus pentoxide from phosphate ore comprising the steps of:

mixing unbeneficiated phosphate ore with silica and solid carbonaceous material in amounts to produce a feed mixture having a $CaO/SiO_2$ mole ratio less than about 0.5;

forming the feed mixture into agglomerated feed particles;

heating the agglomerated feed particles to a temperature greater than approximately 1300° C. for approximately thirty to approximately forty-five minutes, by exposure to radiation emanating from an oxidation zone within a rotary-type kiln, to reduce the phosphate in the agglomerated feed particles by reaction with the solid carbonaceous material to form elemental phosphorus vapors without substantial melting of the agglomerated feed particles; and, introducing into the rotary-type kiln sufficient oxygen-containing gas to cause oxidation of the elemental phosphorus vapor within the oxidation zone to produce phosphorus pentoxide and to heat the agglomerated feed particles.

9. A process for producing phosphorus pentoxide from phosphate ore comprising the steps of:

mixing unbeneficiated phosphate ore with silica and solid carbonaceous material in amounts to produce a feed mixture having a $CaO/SiO_2$ mole ratio less than about 0.5;

co-grinding the unbeneficiated phosphate ore silica and carbonaceous material so that 50 to 85 percent of the co-ground feed mixture passes a $-325$ mesh;

forming the co-ground feed mixture into agglomerated feed particles;

heating the agglomerated feed particles to a temperature greater than approximately 1300° C. for approximately thirty to forty-five minutes, by exposure of radiation emanating from an oxidation zone within a rotary-type kiln, to reduce the phosphate in the agglomerated feed particles by reaction with the solid carbonaceous material to form elemental phosphorus vapors and carbon monoxide without substantial melting of the agglomerated feed particles; and, introducing into the rotary-type kiln sufficient oxygen-containing gas to cause oxidation of the elemental phosphorus vapor within the oxidation zone to produce phosphorus pentoxide and to heat the agglomerated feed particles.

10. The process of claim 9 further comprising the steps of introducing sufficient oxygen-containing gas to cause oxidation of the carbon monoxide within the oxidation zone to heat the porous bed.

11. A process for producing phosphorus pentoxide from phosphate ore comprising the steps of:

mixing unbeneficiated phosphate ore with silica and solid carbonaceous material in amounts to produce a feed mixture having a $CaO/SiO_2$ mole ratio less than about 0.5;

co-grinding the unbeneficiated phosphate ore silica and carbonaceous material so that 50 to 85 percent of the co-ground feed mixture passes a $-325$ mesh;

forming the co-ground feed mixture into agglomerated feed particles;

heating the agglomerated feed particles to a temperature greater than approximately 1300° C. for approximately thirty to forty-five minutes, by exposure to radiation emanating from an oxidation zone within a rotary-type kiln, to reduce the phosphate in the agglomerated feed particles by reaction with the solid carbonaceous material to form elemental phosphorus vapors without substantial melting of the agglomerated feed particles; and, introducing into the rotary-type kiln sufficient oxygen-containing gas to cause oxidation of the elemental phosphorus vapor within the oxidation zone to produce phosphorus pentoxide and to heat the agglomerated feed particles, said process recovering at least 85 percent of the phosphate values in the phosphate ore in the form of phosphorus pentoxide.

* * * * *